United States Patent [19]
Huang

[11] Patent Number: 5,872,709
[45] Date of Patent: Feb. 16, 1999

[54] SWITCH CONTROL OF A MASTER-SLAVE POWER SUPPLY FOR PREVENTING RESIDUAL SLAVE VOLTAGE WHEN A SLAVE IS OFF

[75] Inventor: Chung-Rong Huang, Taoyuan, Taiwan

[73] Assignee: Acer Peripherals, Inc., Taoyuan, Taiwan

[21] Appl. No.: 862,954

[22] Filed: May 30, 1997

[51] Int. Cl.[6] .................................................. H02M 7/00
[52] U.S. Cl. .................................................. 33/72; 307/38
[58] Field of Search .................................. 363/72, 97, 41; 307/38, 39, 29, 112, 125; 327/379, 384

[56] References Cited

U.S. PATENT DOCUMENTS

| | | | |
|---|---|---|---|
| 4,725,940 | 2/1988 | Henze | 363/41 |
| 5,075,565 | 12/1991 | Severinsky et al. | 363/72 |
| 5,122,726 | 6/1992 | Elliott et al. | 323/272 |
| 5,130,561 | 7/1992 | Elliott et al. | 363/72 |
| 5,193,054 | 3/1993 | Galloway et al. | 363/72 |

*Primary Examiner*—Peter S. Wong
*Assistant Examiner*—Derek J. Jardieu

[57] ABSTRACT

An apparatus for switch control of the slave SPS (switching power supply) in a SPS system is provided, with minimized number of the isolation devices, to trigger OFF state of slave SPS DC output signal free from residual voltage. In addition, the inventive apparatus for controlling the slave SPS switching is implemented on the secondary side of the slave SPS only, which eliminates the difficulty and unsatisfactory adjustments associated with the PCB layout process when implementing the invention.

8 Claims, 5 Drawing Sheets

SWITCH CONTROL OF A MASTER-SLAVE POWER SUPPLY FOR PREVENTING RESIDUAL SLAVE VOLTAGE WHEN A SLAVE IS OFF

FIELD OF INVENTION

The invention relates to switch control of a slave switching power supply (SPS) in a multiple SPS system, and is particularly concerned with a circuit implemented on a secondary side of the slave SPS for triggering OFF operation of the slave SPS, such that no residual voltage exists on a DC output terminal of a secondary side circuit of the slave SPS.

BACKGROUND OF INVENTION

A multiple switching power supply (SPS) system is useful in the applications that need more than one SPS. For example, in a thermal printer, a multiple SPS system includes a master SPS supplying a main power supply, and a slave SPS supplying a power for thermal process.

FIG. 1 shows a conventional current mode dual SPS system which is one possible candidate of the SPS system. The dual SPS system includes two current mode controller ICs, CON1 and CON2, in the primary side of the master SPS and the slave SPS, respectively. As a preferred embodiment, commercially available IC UC3842A made by Motorola Semiconductor Company is selected as the current mode controller. The external circuit to the CON1 or CON2 mainly includes the shown first external circuit and second external circuit. An output terminal (pin# 6) of CON2 is connected to the second external circuit 4. A supply voltage $V_{cc}$ terminal (pin# 7) of CON2 is connected to a circuit (not shown in FIG. 1) generating a supply voltage required for the operation of CON2. A reference voltage $V_{ref}$ terminal (pin# 8) of CON2 is connected to a collector terminal of the photo-transistor 33 of the isolation device 20. A compensation terminal (pin# 1) of CON2 is connected to a collector terminal of the photo-transistor 32 of the isolation device 15. A voltage feedback terminal (pin# 2) of CON2 is connected to an emitter terminal of the photo-transistor 33 of the isolation device 20. Both a base terminal of the photo-transistor 32 and a base terminal of the photo-transistor 33 are connected to the common ground. As the slave SPS is powered ON, voltage level of pin# 7 of CON2 is lifted up to 16 volts gradually. Afterwards, pin# 6 of the CON2 generates a slave SPS output signal 111 to activate the power supply shown in FIG. 5. Pin# 8 of CON2 outputs a reference voltage $V_{ref}$ of 5 volts. Either asserting a LOW compensation signal (pin# 1) or a HIGH feedback signal (pin# 2) can turn the slave SPS OFF. Further understanding of the operation of the IC UC3842A can be realized with reference to the description of the corresponding data book.

Basically, control circuit 2 in the secondary side circuit of slave SPS is provided for stabilizing the slave SPS output signal 111 outputted from pin# 6 of CON2. The slave SPS DC output signal 200 is inputted to the secondary side circuit of the slave SPS to stabilize the slave SPS output signal 111 through a negative feedback process described below. Depending on a variation of slave SPS DC output signal 200, a corresponding voltage across the resistor 30 is established and, in turn, adjusts the current flowing through the adjustable Zener diode 25. Moreover, the current flowing into the isolation device 20 depends on the variation of slave SPS DC output signal 200. This leads to a variation of the current flowing through pin# 2 and pin# 8 of the current mode controller CON2. Thus, the duty cycle of the slave SPS output signal 111 is varied, and the stabilization effect is reflected to the secondary side circuit of slave SPS. Through such negative feedback operation, the slave SPS output signal 111 is stabilized gradually, and finally approaches a steady state. In steady state, the slave SPS DC output has value around 14.5 volts. Above descriptions regarding negative feedback operation of the slave SPS is also applicable to that of the master SPS.

Conventionally, switch control of the slave SPS is realized by inputting the slave SPS DC output signal 100 to drive the LED 31 inside the isolation device 15, as illustrated in FIG. 1. The switch control of the slave SPS is implemented via first control circuit 1 in the secondary side circuit of the slave SPS described below. As a switching (ON/OFF) signal 101 is LOW, the isolation device 15 is disabled since the NPN transistor 10 is OFF. Then, the slave SPS keeps ON. On the contrary, as the switching (ON/OFF) signal 101 is turned to HIGH of around 5 volts, the NPN transistor 10 is ON. When the slave SPS DC output signal 100 and switching (ON/OFF) signal 101 both are HIGH, the LED 31 inside the isolation device 15 is ON and, in turns, the photo-transistor 32 is ON. Hence, pin# 1 of the current mode controller CON2 is grounded and the current mode controller CON2 is disabled. Therefore, the slave SPS output signal 111 is disabled. The voltage level of slave SPS DC output signal 100 starts to drop. When the voltage level of slave SPS DC output signal 100 drops to a voltage level of around 2.5 volts, the LED 31 becomes OFF and, in turn, disables the isolation device 15. However, this leads to an increasing voltage level of pin# 1 of CON2. As the voltage level of pin# 1 goes up to a certain level, the restart operation of CON2 is activated automatically. Therefore, the slave SPS is ON again and the voltage level of the slave SPS DC output signal 100 starts to increase which is not desired during OFF operation of slave SPS. As the voltage level of slave SPS DC output signal 100 goes up to a voltage level of around 8.6 volts, the LED 31 is turned ON again. Thus, pin# 1 of the current mode controller CON2 is grounded and the current mode controller CON2 is disabled. Therefore, the slave SPS output signal 111 is disabled again. Going through above stages repeatedly, the slave SPS DC output signal 100 of the conventional approach shows a residual voltage during OFF operation, as shown in FIG. 2.

Therefore, the slave SPS DC output signal 100 shows severe unexpected ripple, e.g. the residual voltage during OFF operation. In other words, a variation on the magnitude of the residual voltage at the DC output terminal of the slave SPS is detected as illustrated in FIG. 2. Such phenomenon exhibits instability in switching OFF the slave SPS of the dual SPS system when the slave SPS DC output signal 100 is employed as an activation signal. Moreover, in this conventional approach, more than one isolation device in the slave SPS are required, and this requirement means more space are needed and also introduces a certain level of difficulty during PCB layout process.

Therefore, it is desirable to eliminate the above-mentioned residual voltage generated during OFF operation of the slave SPS by another approach.

The main object of the present invention is to provide a cost effective solution to eliminate the residual voltage mentioned above with minimized number of the isolation devices.

The inventive apparatus for controlling the switching of slave SPS is implemented on the secondary side circuit of the slave SPS only, and this approach eliminates difficulties in the PCB layout process.

SUMMARY OF INVENTION

An apparatus for the switch control of the slave SPS in the dual SPS system is provided. The SPS system includes a slave SPS and a master SPS, each having a primary side circuit, a secondary side circuit and an isolation device disposed between the primary side circuit and the secondary side circuit, respectively. The primary side circuit of the master SPS has an output terminal generating a master SPS output signal as the master SPS is ON. The primary side circuit of the slave SPS has an output terminal generating a slave SPS output signal as the slave SPS is ON. The secondary side circuit of the slave SPS receives the master SPS DC output signal and, responsive to a switching (ON/OFF) signal, triggers OFF operation of the slave SPS such that no residual voltage exists on the output terminal of the secondary side circuit of the slave SPS.

Moreover, the inventive apparatus occupies less space which, in turn, eliminates difficult adjustment in the PCB layout process associated with the conventional approach.

Also, since the inventive apparatus for controlling the slave SPS switching is implemented on the secondary side of the slave SPS, which is independent on the primary side of the slave SPS, the safety regarding high voltage is not an issue.

Although the invention is illustrated by following embodiments which includes only one slave SPS in the system, it is readily observed the spirit of the invention is applicable to multiple SPS system having more than one slave SPS.

BRIEF DESCRIPTION OF THE APPENDED DRAWINGS

DETAILED DESCRIPTION OF THE INVENTION

Figure 1:
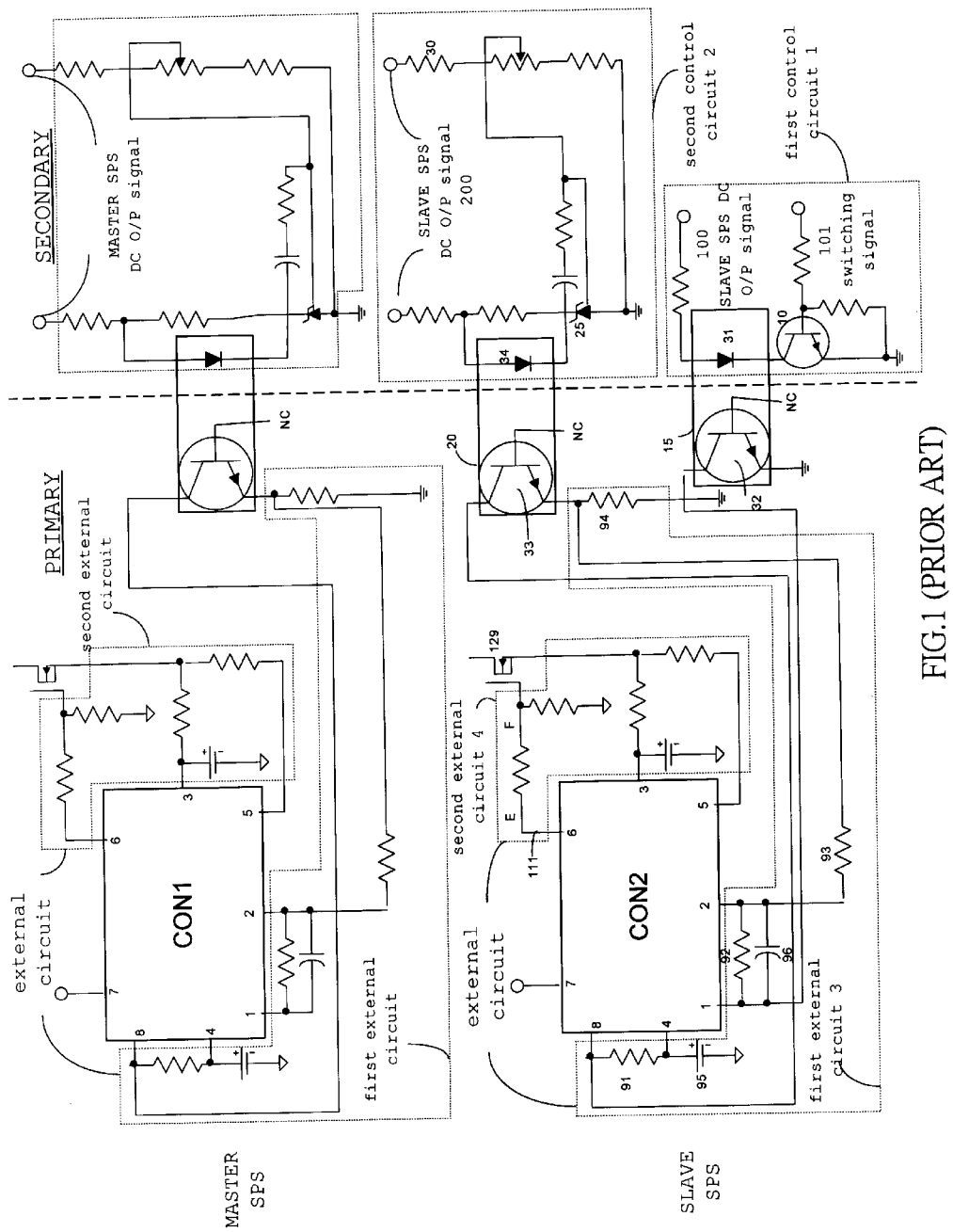
FIG. 1 shows a dual switching power supply system of the prior arts.

A preferred embodiment of the present invention will be described below with reference to FIG. 3, wherein reference numerals are used to designate the parts and components shown in the figure. However, due to the circuit arrangements of the master SPS of the invention is same as conventional one shown in FIG. 1, only the circuit associated with slave SPS is disclosed and recited hereinafter.

Figure 3:
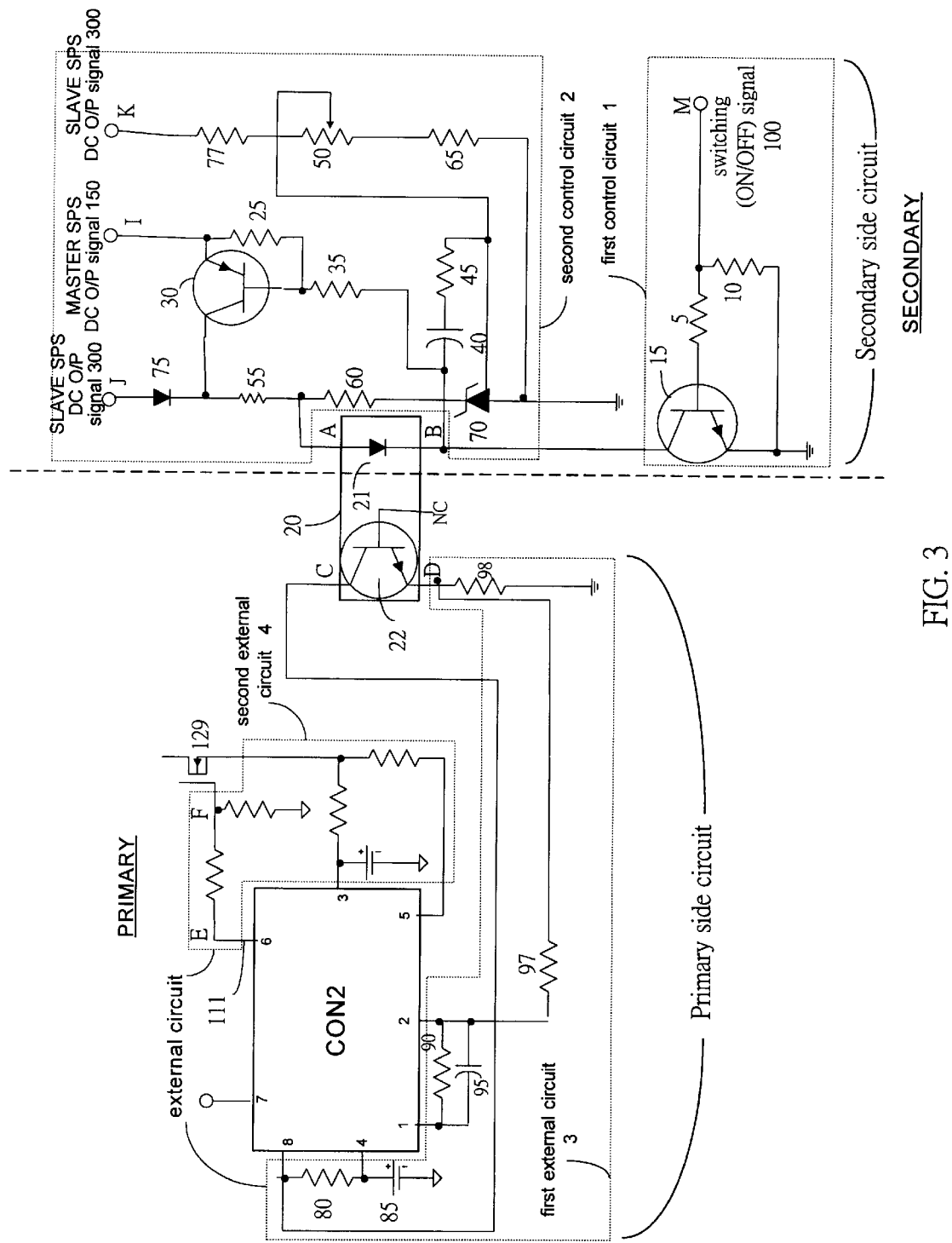
FIG. 3 shows the circuit of a preferred embodiment of slave SPS of the invention.
Figure 5:
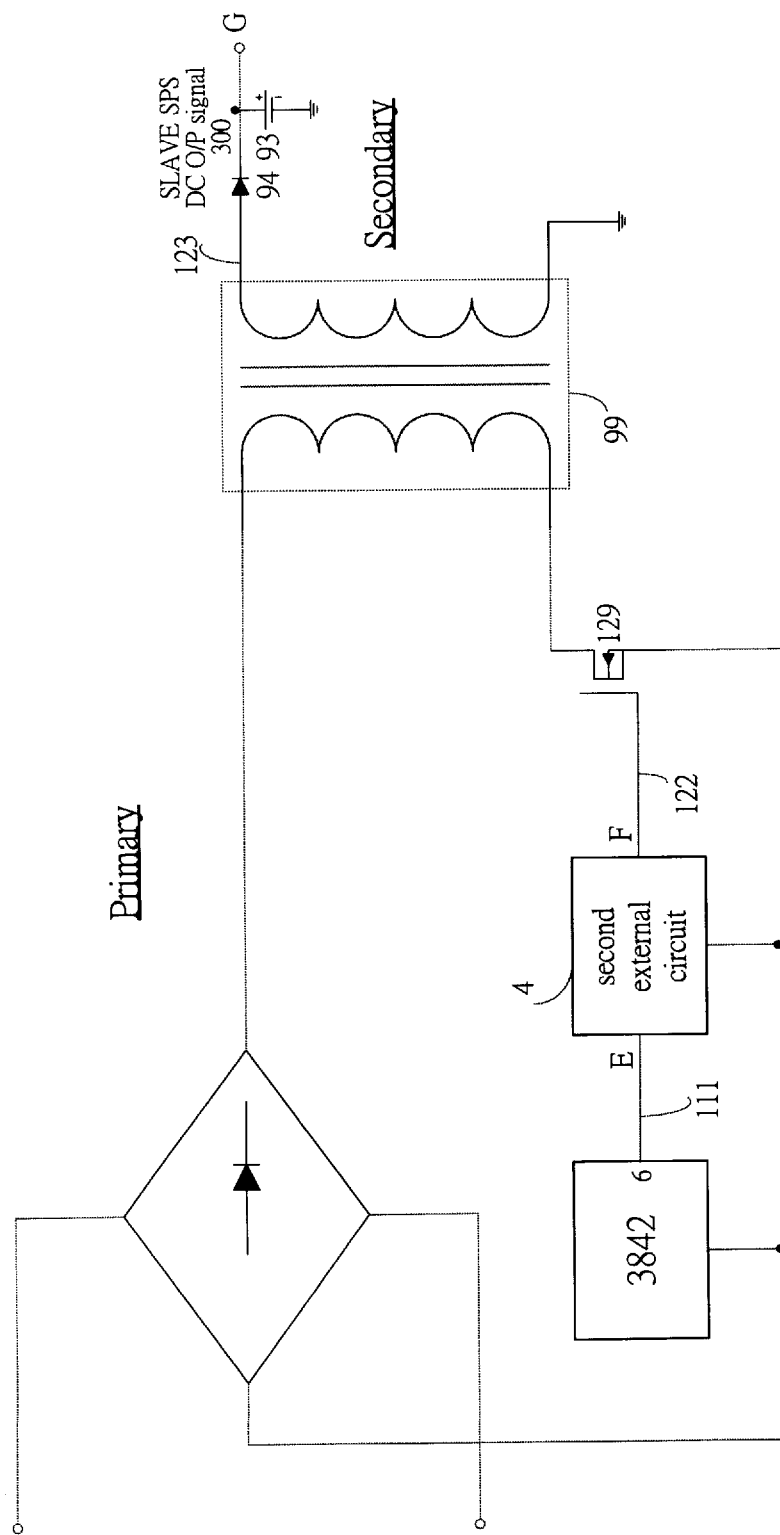
FIG. 5 shows how slave output signal at pin#6 of UC3842A generates (induces) the slave SPS DC output signal.

The dual switching power supply (SPS) system of the instant invention includes a slave SPS, shown in FIG. 3, which has a primary side circuit, a secondary side circuit and an isolation device 20 disposed therebetween. The primary side circuit has an output terminal (pin #6) generating a slave SPS output signal 111 as the slave SPS is ON. The secondary side circuit receives the slave SPS DC output signal 300 to stabilize the slave SPS output signal 111 through a negative feedback operation performed on the primary side circuit of the slave SPS. FIG. 5 shows how the slave SPS output signal 111 generates (induces) the slave SPS DC output signal 300, and detailed descriptions of FIG. 5 will be introduced later.

According to the invention, the secondary side circuit of the slave SPS receives the master SPS DC output signal 150 and, responsive to a switching (ON/OFF) signal 100, triggers OFF operation of the slave SPS such that no residual voltage exists on the DC output terminal of the secondary side circuit of the slave SPS.

The primary side circuit of the slave SPS includes a current mode controller CON2 together with an associated external circuit. The external circuit includes a first external circuit 3 and a second external circuit 4 both of which are well known in the arts. It is well realized, as Motorola UC3842A is implemented as CON2, that pin# 7 of the UC3842A is connected to a supply voltage $V_{cc}$, and pin# 8 of the UC3842A generates a reference voltage $V_{ref}$ of 5 volt as the slave SPS is turned ON.

As shown in FIG. 3, the first external circuit 3 includes the resistors 80, 90, 97, 98, and the capacitors 85, 95. A first terminal of the resistor 80 is connected to pin# 8 of CON2, and this terminal also is connected to terminal C of the isolation device 20. A second terminal of the resistor 80 is connected to pin# 4 of CON2. The resistor 90 is disposed between pin# 1 and pin# 2 of CON2. The terminal of resistor 90 connecting pin #2 is further connected to terminal D of the isolation device 20 via the resistor 97. The terminal D is grounded via the resistor 98. A first terminal of the capacitor 85 is connected to the second terminal of the resistor 80. A second terminal of the capacitor 85 is connected to the common ground. The second capacitor 95 is disposed in parallel with the resistor 90. A first terminal of the resistor 97 is connected to pin# 2 of CON2. A second terminal of the resistor 97 is connected to the terminal D.

As illustrated in FIG. 5, the second external circuit 4 has an input terminal E receiving the output signal 111 outputted by pin# 6 of CON2. The second external circuit 4 has an output terminal F to generate a control signal 122 to control the switching of a MOS transistor 129. Thus, energy can be transformed from the primary side to the secondary side of the slave SPS via a transformer 99. The pulsed signal 123 is rectified by an output diode 94 and is then passed through an output capacitor 93 to reduce ripple voltage. The slave SPS DC output signal 300 is picked up at the output terminal G.

Shown in FIG. 3, a preferred embodiment of the isolation device 20 is a well known photo-coupler. The photo-coupler 20 includes a light emitting diode (LED) 21 and a phototransistor 22. A cathode of the LED 21 forms the terminal B of the photo-coupler 20. An anode of the LED 21 forms the terminal A of the photo-coupler 20. The detailed operation of a photo-coupler 20 is well known in the arts.

The secondary side circuit of the slave SPS includes a first control circuit 1, which selectively enables operation of LED 21, and a second control circuit 2, which inputs the master SPS DC output signal 150 to drive the LED 21.

The first control circuit 1 has an input terminal M for receiving the switching (ON/OFF) signal 100. The first control circuit 1 includes a NPN transistor 15 and the resistors 5, 10. A first terminal of the resistor 5 forms the input terminal M of the first control circuit 1. A second terminal of the resistor 5 is connected to base terminal of the NPN transistor 15. The resistor 10 is disposed between emitter terminal and base terminal of the NPN transistor 15. The emitter terminal of the NPN transistor 15 is connected to a common ground. The collector terminal of the NPN transistor 15 is connected to the terminal B of the isolation device 20. The operation of the LED 21 depends on voltage across the terminals B and A.

The second control circuit 2 has a first input terminal I for receiving the master SPS DC output signal 150. The second control circuit 2 has a second input terminal J for receiving the slave SPS DC output signal 300. The second control circuit 2 has a third input terminal K for receiving the slave SPS DC output signal 300. The second control circuit 2 includes the resistors 25, 35, 45, 55, 60, 65, and 77, a variable resistor 50, a capacitor 40, a diode 75, an adjustable Zener diode 70, and a NPN transistor 30. A first terminal of the resistor 25 is connected to emitter terminal of the NPN transistor 30 and forms the first input terminal I. A second terminal of the resistor 25 is connected to base terminal of the NPN transistor 30. The resistor 35 is disposed between second terminal of the resistor 25 and first terminal of the capacitor 40. A first terminal of the resistor 45 is connected to second terminal of the capacitor 40. A second terminal of resistor 45 is connected to a third terminal of the variable resistor 50. A first terminal of the resistor 55 is connected to a collector terminal of the NPN transistor 30. A second terminal of the resistor 55 is connected to the terminal A of the isolation device 20. A first terminal of the resistor 60 is connected to the second terminal of the resistor 55. A second terminal of the variable resistor 50 is connected to a first terminal of the resistor 65. The second terminal of the resistor 45 is connected to a third terminal of the adjustable Zener diode 70. The first terminal of the capacitor 40 is connected to the terminal B of the isolation device 20. A cathode terminal of the adjustable Zener diode 70 is connected to a second terminal of the resistor 60. An anode terminal of the adjustable Zener diode 70 is connected to a common ground. A second terminal of the resistor 65 is connected to the anode terminal of the adjustable Zener diode 70. A cathode terminal of the diode 75 is connected to the collector terminal of the NPN transistor 30. An anode terminal of the diode 75 forms the second input terminal J. A first terminal of the resistor 77 forms the third input terminal K. The second terminal of resistor 77 is connected to the first terminal of resistor 50.

The switch control of the slave SPS of the invention is accomplished by the first control circuit 1 together with the second control circuit 2 shown. As the switching (ON/OFF) signal 100 is LOW, the negative feedback operation to CON2 and current flowing through the photo-coupler 20 is controlled by the operation of the adjustable Zener diode 70. During this time, the first control circuit 1 does not provide additional function.

The slave SPS keeps ON as the switching (ON/OFF) signal 100 is LOW regardless of voltage level of the master SPS DC output signal 150 since the NPN transistor 15 is disabled.

However, as the switching (ON/OFF) signal 100 becomes HIGH, the terminal B of the photo-coupler 20 is grounded since the NPN transistor 15 is enabled. In response, the LED 21 generates its maximum intensity and, in turns, completely conducts the photo-transistor 22. Therefore, the operation of the photo-coupler 20 is independent of the operation of adjustable Zener diode 70 during this period. The reference voltage $V_{ref}$ outputted from pin# 8 of CON2 is inputted to pin# 2 of CON2 via the photo-transistor 22. As such, the voltage level to pin# 2 of CON2 is increased up to the reference voltage $V_{ref}$. Therefore, the output at pin# 6 of CON2 is disabled which turns OFF the slave SPS.

On the other hand, since the NPN transistor 30 keeps ON regardless of the NPN transistor 15 being ON, the master SPS DC output signal 150 keeps on providing the required voltage to turn the LED 21 ON. In other words, the LED 21 always generates light as long as the master SPS DC output signal 150 exists. During the restart operation of CON2, the voltage level at pin# 2 is lifted up to the reference voltage $V_{ref}$ by pin# 8 of CON2 within a very short time, which disables the output 111 from pin# 6 of CON2.

Figure 2:
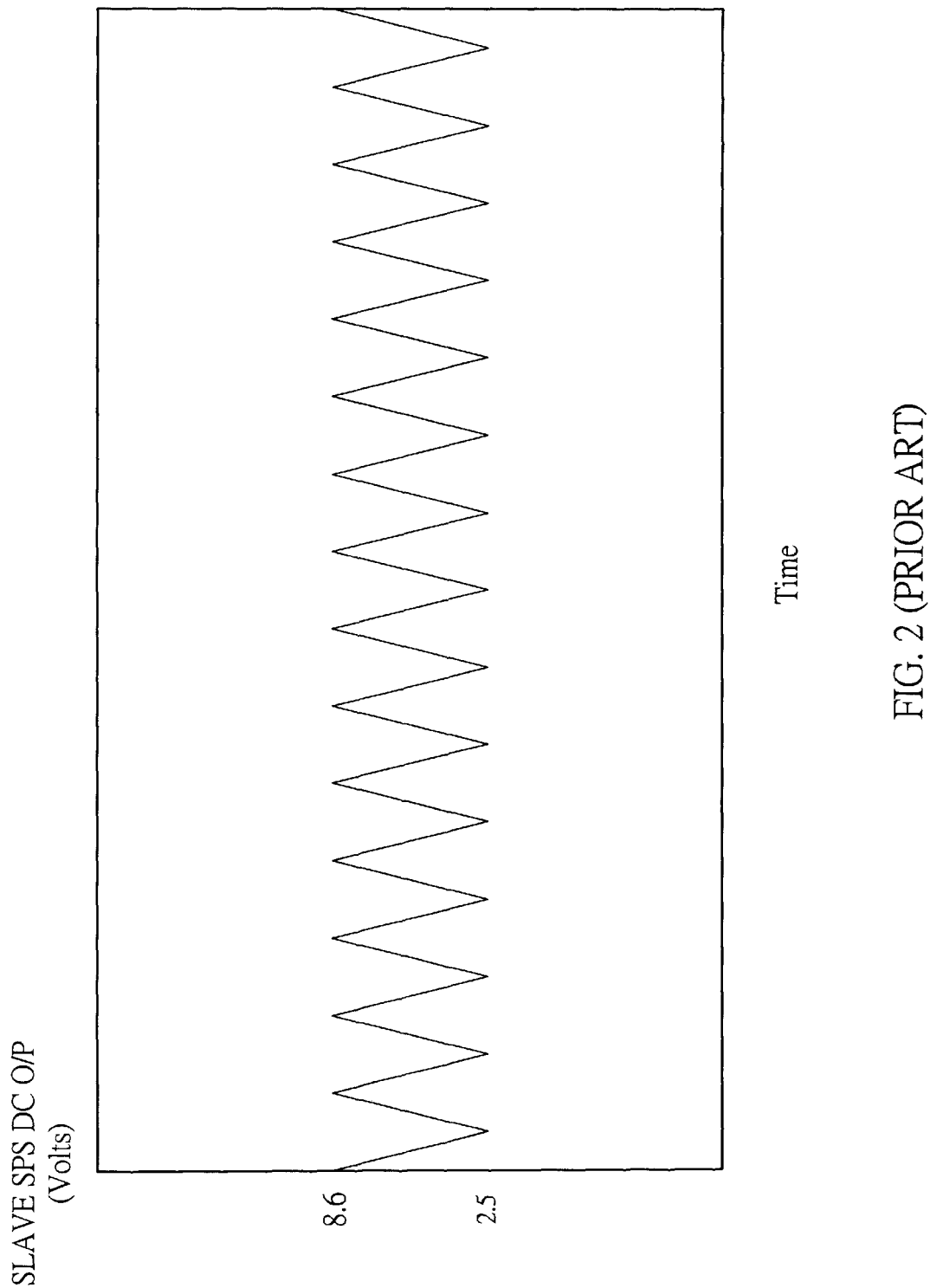
FIG. 2 illustrates a residual voltage generated as OFF operation of the slave SPS in FIG. 1 is performed.
Figure 4:
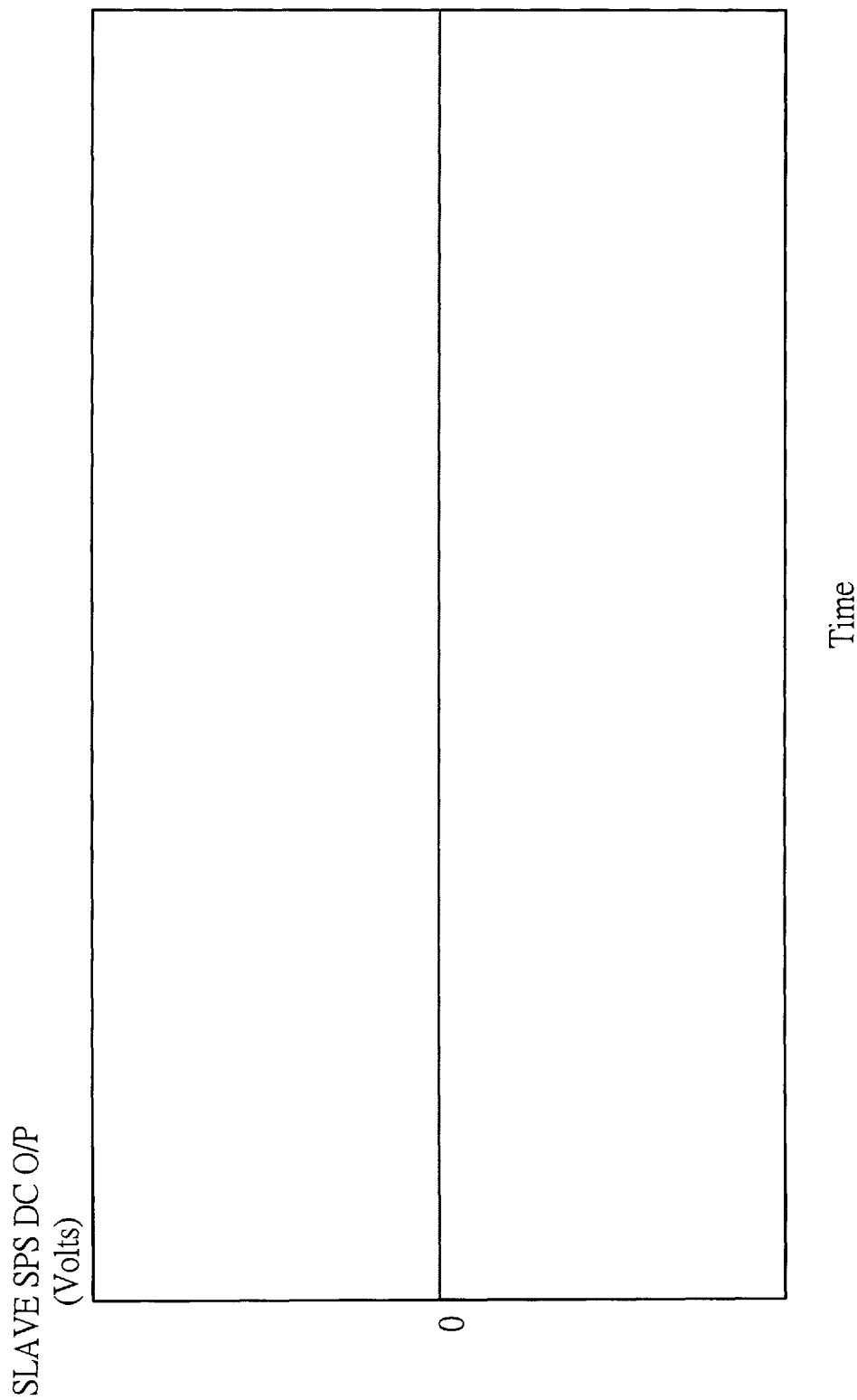
FIG. 4 is the slave SPS DC output signal without residual voltage, measured under the DC mode, as OFF operation of the slave SPS shown in FIG. 3 is performed.

It is observed the photo-coupler 20 of the present invention is driven by the master SPS DC output signal 150 instead of slave SPS DC output signal of the conventional approach. Since the present invention employs master SPS DC output signal 300 and the switching signal 100 for turning the slave SPS OFF, the residual voltage, shown in FIG. 2, associated with the conventional approach is substantially eliminated, which is best illustrated in FIG. 4.

Although the above illustrated embodiment includes only one slave SPS in the system, it is readily observed the spirit of the invention is applicable to multiple SPS system having more than one slave SPS.

I claim:

1. A switching power supply (SPS) system, comprising:
   a master SPS having a primary side circuit, a secondary side circuit and an isolation device disposed between the primary side circuit and the secondary side circuit of the master SPS, the primary side circuit having an output terminal generating a master SPS output signal as the master SPS is ON, the secondary side circuit of the master SPS receiving a master SPS DC output signal;
   a slave SPS having a primary side circuit, a secondary side circuit and an isolation device disposed between the primary side circuit and the secondary side circuit of the slave SPS, the primary side circuit of the slave SPS having an output terminal generating a slave SPS output signal as the slave SPS is ON, the secondary side circuit of the slave SPS receiving the master SPS DC output signal and, responsive to a switching (ON/OFF) signal, triggering OFF operation of the slave SPS such that no residual voltage exists on a DC output terminal of a secondary side circuit of the slave SPS.

2. The switching power supply system of claim 1, wherein said secondary side circuit of the slave SPS comprises a first control circuit and a second control circuit, the second control circuit has a first input terminal for receiving the master SPS DC output signal, the second control circuit has a second input terminal for receiving the slave SPS DC output signal, the second control circuit has a third input terminal for receiving the slave SPS DC output signal, and the first control circuit has an input terminal for receiving the switching (ON/OFF) signal.

3. The switching power supply system of claim 2, wherein said second control circuit comprises a first resistor, a second resistor, a third resistor, a diode and a NPN transistor, a first terminal of said first resistor forms the first input terminal of the second control circuit, a second terminal of said first resistor is connected to a base terminal of said NPN transistor, a first terminal of said third resistor is connected to a collector terminal of said NPN transistor, a second terminal of said third resistor is connected to the first terminal (A) of the isolation device of said slave SPS, a cathode terminal of said diode is connected to the collector terminal of said NPN transistor, an anode terminal of said diode forms the second input terminal of the second control circuit, and a first terminal of said sixth resistor forms the third input terminal of the second control circuit.

4. The switching power supply system of claim 2, wherein said slave SPS keeps ON as the switching (ON/OFF) signal is de-asserted.

5. The switching power supply system of claim 2, wherein said slave SPS is turned OFF as the switching (ON/OFF) signal is asserted.

6. The switching power supply system of claim 1, wherein said isolation device is a photo-coupler.

7. The switching power supply system of claim 6, wherein said photo-coupler comprises a light emitting diode (LED)

and a photo-transistor, an anode terminal of said LED forms a first terminal (A) of said isolation device of the slave SPS, a cathode terminal of said LED forms a second terminal (B) of the isolation device of the slave SPS, a collector terminal of said photo-transistor forms a third terminal (C) of said isolation device of the slave SPS, an emitter terminal of said photo-transistor forms and a fourth terminal (D) of said isolation device of the slave SPS, a base terminal of the photo-transistor of said photo-coupler is connected to the common ground.

8. The switching power supply system of claim 7, wherein said first control circuit comprises a NPN transistor, a first resistor, and a second resistor, a first terminal of said first resistor forms the input terminal of said first control circuit, a second terminal of said first resistor is connected to a base terminal of said NPN transistor, said second resistor is disposed between an emitter terminal of said NPN transistor and the base terminal of said NPN transistor, the emitter terminal of said NPN transistor is connected to a common ground, and a collector terminal of said NPN transistor is connected to the second terminal (B) of the isolation device of said slave SPS.

* * * * *

UNITED STATES PATENT AND TRADEMARK OFFICE
CERTIFICATE OF CORRECTION

PATENT NO. : 5,872,709
DATED : October 5, 1999
INVENTOR(S) : Chung-Rong Huang

It is certified that error appears in the above-identified patent and that said Letters Patent is hereby corrected as shown below:

Column 1,
Line 43, delete "connected to the common ground" and insert -- floating --.
Line 60, before "resistor", insert -- variable --.
Line 60, delete "30".
Lines 64-66, delete "This leads to a variation of the current flowing through pin# 2 and pin# 8 of the current mode controller CON2" and insert -- The voltage across resistor 94 is changed, and the voltage at pin#2 of CON2 also changes. --
Line 66, after "Thus," insert -- via the internal negative feedback of CON2. --

Column 2,
Line 22, after "SPS", insert -- stops sending the --.
Lines 22-23, delete "is disabled".
Line 36, after "SPS", insert -- stops sending the --.
Line 37, delete "is disabled".
Line 48, delete "signal" and insert -- power --.
Line 49, after "device", insert -- between the primary side and secondary side --.

Column 5,
Line 6, delete "NPN" and insert -- PNP --.
Line 7, delete "NPN" and insert -- PNP --.
Line 10, delete "NPN" and insert -- PNP --.
Line 15, delete "NPN" and insert -- PNP --.
Line 30, delete "NPN" and insert -- PNP --.
Line 59, delete "NPN" and insert -- PNP --.

Column 6, claim 3,
Line 45, delete "NPN" and insert -- PNP --.
Line 48, delete "NPN" and insert -- PNP --.
Line 50, delete "NPN" and insert -- PNP --.
Line 54, delete "NPN" and insert -- PNP --.
Line 56, delete "sixth" and insert -- second --.

Column 6, claim 6,
Line 64, delete "1" and insert -- 2 --.

UNITED STATES PATENT AND TRADEMARK OFFICE
CERTIFICATE OF CORRECTION

PATENT NO. : 5,872,709
DATED : October 5, 1999
INVENTOR(S) : Chung-Rong Huang

It is certified that error appears in the above-identified patent and that said Letters Patent is hereby corrected as shown below:

Column 7, claim 7,
Lines 9-10, delete "connected to the common ground" and insert -- floating --.

Signed and Sealed this

Ninth Day of April, 2002

Attest:

JAMES E. ROGAN
Attesting Officer
Director of the United States Patent and Trademark Office